H. A. RHODES.
POWER TRANSMISSION MECHANISM.
APPLICATION FILED FEB. 19, 1916.

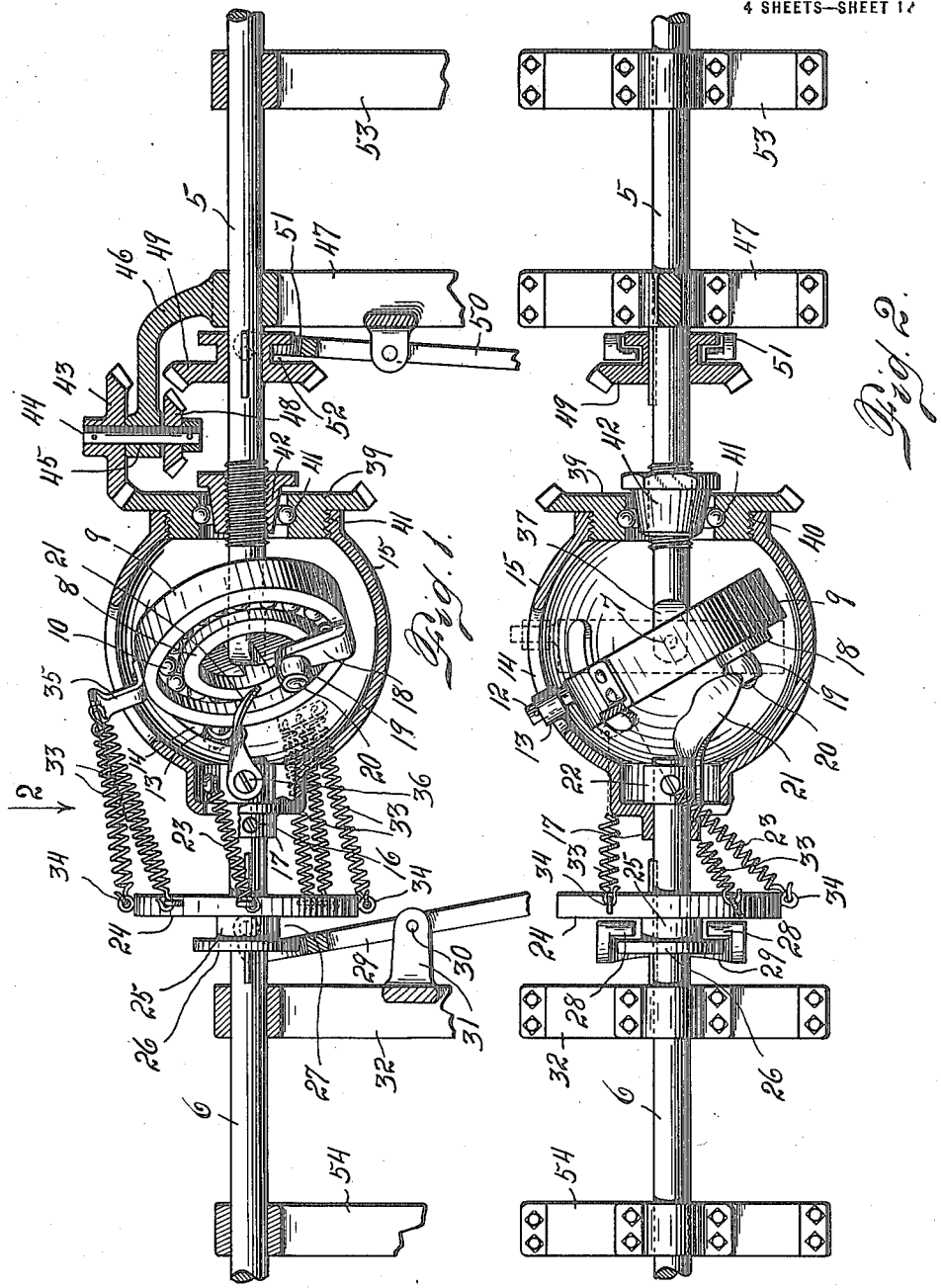

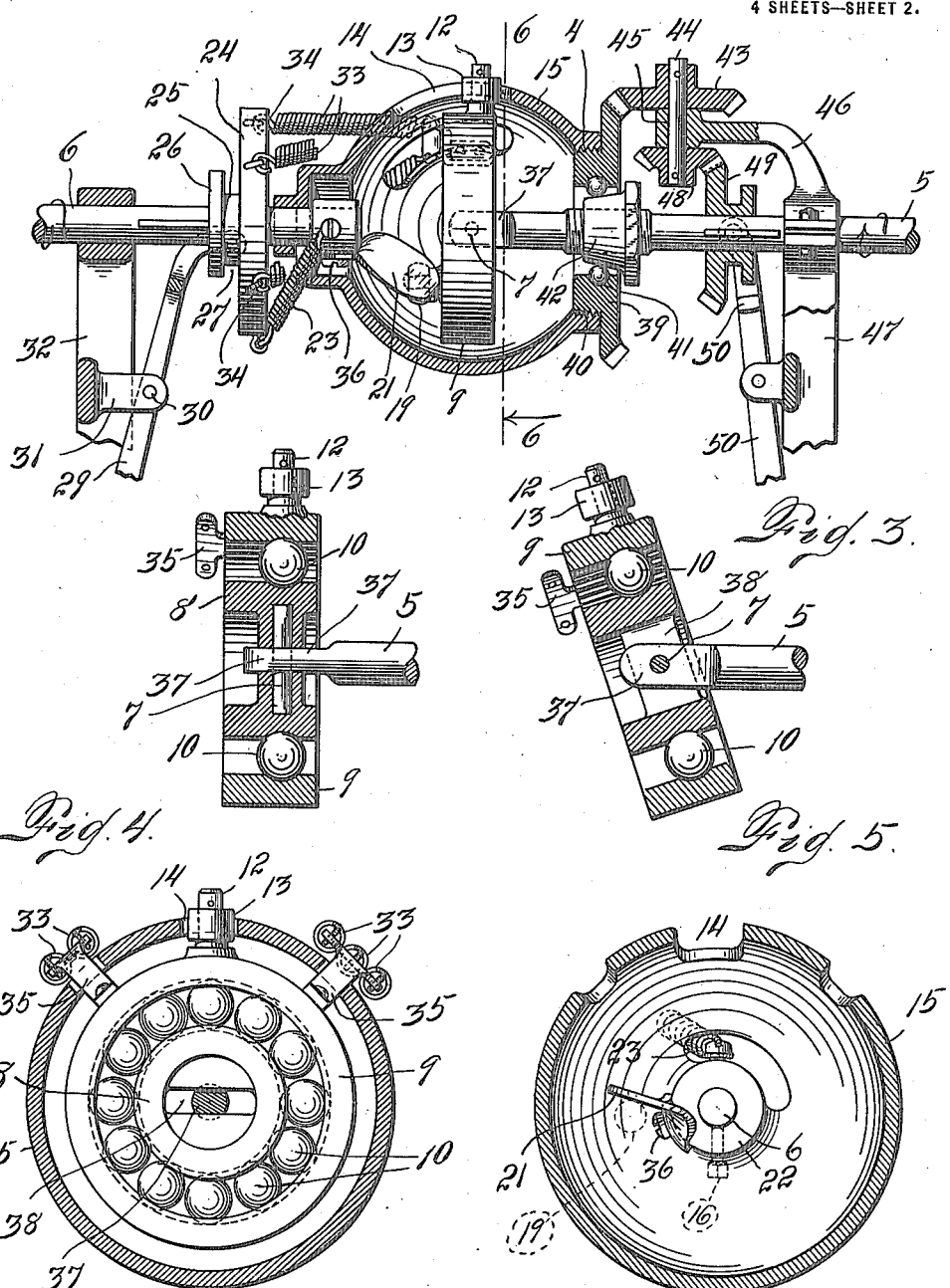

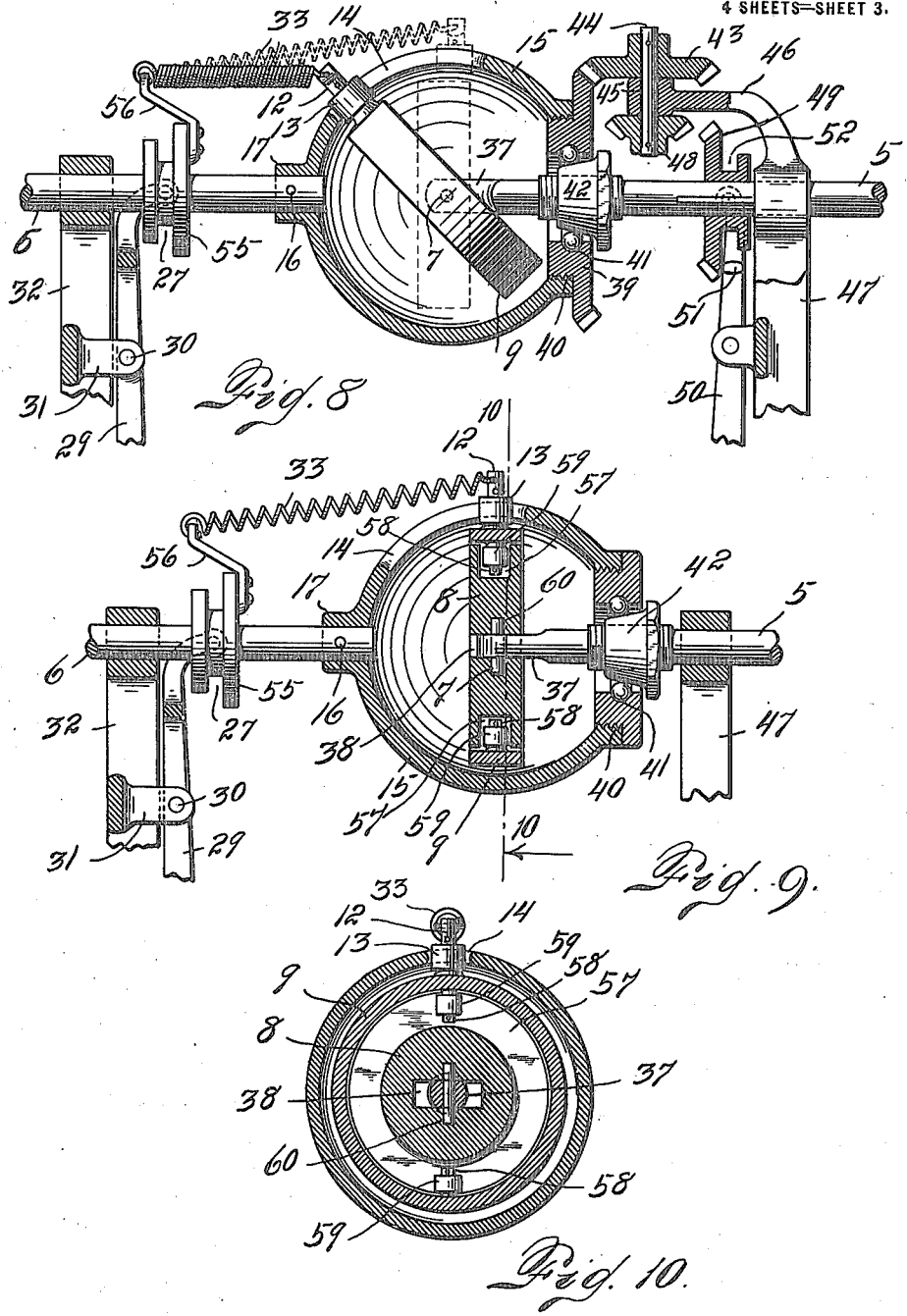

1,263,701.

Patented Apr. 23, 1918.
4 SHEETS—SHEET 4.

Witness
Otto E. Hoddick.
John B. Dade.

Inventor
Harry A. Rhodes.
By A. J. ——— Attorney

UNITED STATES PATENT OFFICE.

HARRY A. RHODES, OF DENVER, COLORADO.

POWER-TRANSMISSION MECHANISM.

1,263,701. Specification of Letters Patent. Patented Apr. 23, 1918.

Application filed February 19, 1916. Serial No. 79,228.

*To all whom it may concern:*

Be it known that I, HARRY A. RHODES, a citizen of the United States, residing at the city and county of Denver and State of Colorado, have invented certain new and useful Improvements in Power-Transmission Mechanism; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in transmission mechanism or means of transferring power from a driving to a driven shaft and while particularly well adapted for use in connection with automobiles for use in transmitting power from the engine to the road wheels of the vehicle, it must be understood that it is adapted for use generally for power transmission purposes.

My object is to provide a construction of this class in which the use of gears are to a large extent eliminated, thus doing away with one of the most objectionable features of the transmission mechanisms heretofore in use. My further object is to provide such a connection between the driving and driven shafts that the relation between them shall be automatically controlled according to the load carried by the vehicle or other machine. For instance, in my improvement, if, for any reason, the load is so great that the engine has not sufficient power, the driven shaft may cease its rotation while the engine shaft continues its rotary movement, without any effort on the part of the chauffeur or other person in charge. My further object is to provide a construction of this character in which the parts which connect the two shafts are yieldingly retained in their normal position for producing unitary rotation, and whereby in the event that the load is increased beyond the power of the engine, the parts shall automatically adjust themselves to permit independent rotary movement of the engine shaft, without subjecting the mechanism to any shock, concussion or jar.

My improvement consists, generally speaking, in a connection between the driving and driven shafts, whereby a member connected with the driving shaft to rotate therewith, is arranged in annular relation with an outer bearing member, the two members being spring held in an inclined position with reference to the two shafts, whereby these two members are in non-coaxial relation with the driving shaft. The two members, that is to say, the driving member and the bearing member, are so connected that their relation to each other is always annular, and, therefore, being such that while the driving member may rotate freely within the outer bearing member when the two members are in coaxial relation with the driving shaft, they form a clutch when in non-coaxial relation with the driving shaft whereby the driving and driven shafts are caused to rotate in unison, the outer bearing member having a projection which engages a part rigidly mounted on the driven shaft; and, in the event that the driven shaft is for any reason prevented from rotary movement, whereby the said bearing part is also prevented from rotary movement with the driving shaft, the movement of the driving shaft through the medium of the driving member connected therewith, imparts such a stress to the bearing member, as will gradually move both members into coaxial relation with the driving shaft, against the tension of the springs, which normally hold the two members in the inclined position. As soon as the two members reach the coaxial relation with the driving shaft, the inner or driving member of the clutch, rotates freely within the bearing member, which is locked against rotation, by virtue of the engagement of its projection with the part rigidly connected with the driven shaft, as heretofore explained.

The construction is also such that the two members may be manually thrown into and out of coaxial relation with the driving shaft, since the part with which the springs are connected for normally holding the bearing member in non-coaxial relation with the driving shaft, is connected with a yoke and mounted to slide freely on the driven shaft, for the purpose of increasing the tension of the springs whereby the aforesaid non-coaxial relation is normally maintained, and also for the purpose of releasing the springs and causing them either through compression or otherwise, to maintain the coaxial relation between the driving and driven clutch members. Hence, the mechanism is manually adjustable from the neutral position, whereby the driving member turns freely within the driven member, to the inclined position or non-coaxial position, in which it may be held under greater or less stress or spring tension as may be desired. Other features of the mechanism and their functions will be set forth in detail as this specification proceeds.

Having briefly outlined my improved construction, as well as the functions which it is intended to subserve, I will proceed to describe the same in detail, reference being made to the accompanying drawing, in which is illustrated an embodiment thereof. In this drawing,—

Figure 1 is an elevation partly in section, showing my improved mechanism.

Fig. 2 is a view of the same looking in the direction of arrow 2, Fig. 1.

Fig. 3 is a fragmentary view showing the driving and driven clutch members, in coaxial relation with the driving shaft, whereby the driving member of the clutch is allowed to rotate freely within the driven member.

Fig. 4 is a section taken through the two clutch members, showing the same in coaxial relation with the driving shaft.

Fig. 5 is a similar view showing the clutch members in non-coaxial relation with the driving shaft.

Fig. 6 is a section taken on the line 6—6, Fig. 3, looking toward the left.

Fig. 7 is a similar section showing the member which is rigid with the driven shaft, but with both clutch members removed.

Fig. 8 is a section similar to Fig. 3 but showing a slightly modified form of construction, and the clutch members in a different position with relation to the driving shaft.

Fig. 9 is a section showing a modified form of clutch construction.

Fig. 10 is a section taken on the line 10—10, Fig. 9, looking toward the left.

The same reference characters indicate the same parts in all the views.

Figure 11:
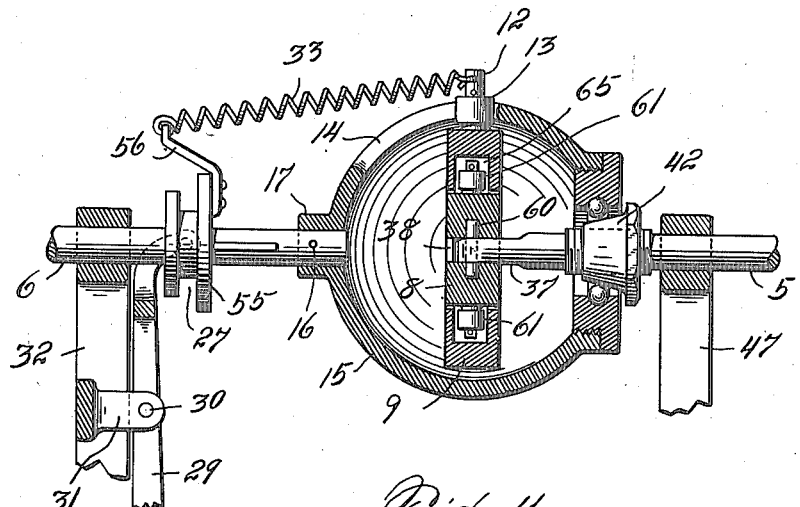
Fig. 11 is a view similar to Fig. 9, but showing a slightly modified form of construction.
Figure 12:
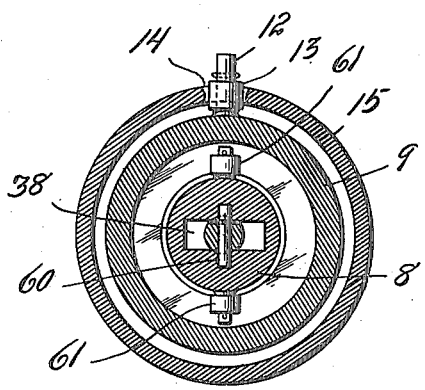
Fig. 12 is a section taken on the line 12—12, Fig. 11.

Referring more particularly to Figs. 1 to 8 inclusive, let the numeral 5 designate the driving or engine shaft and 6 the driven shaft of my improved transmission mechanism. To the inner extremity of the shaft 5, is pivotally connected as shown at 7, a ring 8 which is spaced from an annular ring 9 by bearing balls 10 which engage grooves formed in the two annular members. The member 9, is provided with a projection 12 upon which is mounted an anti-frictional roller 13 which is located in a slot 14 formed in an approximately spherical housing 15 which is secured to the driven shaft 6 by means of a set screw 16 which passes through a collar 17 formed on the housing, and enters a threaded perforation or recess formed in the shaft 6. Also mounted on the outer ring or clutch member 9, is an inwardly projecting crank 18 which carries at its inner extremity an anti-frictional roller 19 mounted on the crank pin 20. This roller engages a cam 21 which is mounted on a collar 22 which is loose on the shaft 6 and which is connected by means of a spring 23 with a disk 24 which is splined on the shaft, the said disk having a collar 25 which carries a circular flange 26, spaced from the disk 24 as shown at 27 to receive the inner oppositely arranged projections 28 of a yoke 29 which is fulcrumed as shown at 30 on a stationary projection 31 carried by a supporting member 32. The disk 24 is connected with the clutch member 9, by means of one or more springs 33. In the drawing a number of these springs is employed, one extremity of each being connected with the disk as shown at 34 while their opposite extremities are connected with two projections 35, which are so arranged that when the springs are stretched by moving the disk 24 toward the left, the stretching tension of the springs will normally maintain the clutch member 9 and the inner co-operating clutch member 8 in a position inclined to the driving shaft, or so that a plane cutting the clutch members circumferentially at right-angles to their axis, shall form oblique angles with the axis of the driving shaft 5. This position or relation of the clutch to the driving shaft is illustrated in Figs. 1, 2, 5 and 8. As shown in the drawing, the cam 21 is secured to the collar 22 by means of a screw 36. The inner extremity of the driving shaft 5, as shown in the drawing, is flattened as shown at 37 to enter a slot 38 formed in the clutch member 8, the pivot pin 7 passing through the flattened extremity of the shaft and anchored in the member 8. This construction allows the annularly arranged members 8 and 9 to move into and out of coaxial relation with the shaft 5 as may be required, the annular relation of these two members being maintained by virtue of the fact that the bearing balls 10 engage circumferential grooves or raceways formed in the two members, the grooves of the member 8 being exterior and that of the member 9 interior.

From the foregoing description it will be understood that when the mechanism is operated normally, or under ordinary conditions, the rotation of the driving shaft 5, will impart a corresponding movement to the driven shaft 6 and at the same speed, the tension of the springs 33 being so regulated as to maintain the members 8 and 9 in the inclined position or in non-coaxial relation with the driving shaft. Hence, the two members 8 and 9 must turn in unison, and, as the member 9 is so connected with the housing 15 or an equivalent abutment rigidly mounted on the shaft 6, the said housing and its shaft must rotate with the shaft 5. However, assuming that for any reason the resistance of the shaft 6 is abnormally great, and greater than the engine is intended to handle, whereby the rotation of the shaft 6 in unison with the shaft 5 ceases, the stress imparted by the shaft 5 directly to the inner clutch member 8, and acting on the annular clutch member 9, will throw the two clutch members into coaxial relation with the shaft 5, which position is, however, maintained only for an instant, since, as soon as the rotation of the inner member 8 has made approximately one-half of a revolution, the recoil of the springs 33 will act to return the clutch members 8 and 9 to their inclined position or into non-coaxial relation with the driving shaft, after which the aforesaid act will be repeated, assuming that the undue resistance on the shaft 6 is maintained. In other words, a half revolution of the driving shaft is sufficient by virtue of the stress imparted to the clutch member 9 by reason of the independent movement of the member 8 therein, to bring the two clutch members into coaxial relation with the driving shaft, and as soon as this occurs the tension of the springs, whose force is applied approximately parallel with the axis of the driving shaft, will move the two clutch members into non-coaxial relation with the driving shaft, as soon as the pivot pin 7 is in such position that the tension of the springs is exerted approximately at right angles to the axis of the pivot. Hence, the engine or motor, together with the driving shaft 5, will continue its rotation independently of the driven shaft 6, until the engine is stopped by the chauffeur or engineer, or until the load or resistance to the movement of the driven shaft, is brought into proper relation with the power of the engine for operating purposes. The movement of the exterior member 9, during the rotation of the shaft 5 while the shaft 6 remains stationary, is oscillatory in character and is permitted by reason of the fact that the opening 14 in the housing 15 which also serves as an abutment, is elongated to allow the projection 12 of the member 9 and its anti-frictional roller 13, to move back and forth therein. The stress exerted on the member 9 by the independent rotation of the member 8 during the oscillatory movement of the member 9, is balanced by reason of the fact that the roller 19 mounted on the crank pins 20 as heretofore explained, and rigidly secured to the member 9, acts on the cam 21, which being yieldingly retained in position by the spiral spring 23, while offering the necessary resistance for balancing purposes, at the same time yields sufficiently to allow the member 9 to oscillate as heretofore explained. When the chauffeur or engineer wishes to disconnect the driving and driven shafts, or, in other words, desires the engine to run while the shaft 6 remains stationary or when the motor vehicle, for instance, is standing still, he simply shifts the disk 24 toward the housing 15 by the employment of the yoke 29 (see Fig. 3), in which event the coaxial relation between the clutch members 8 and 9 and the driving shaft 5 is maintained, thus allowing the member 8 to rotate freely within the member 9 without exerting any stress upon the latter.

In order to make provision for reversing the direction of travel of the driven shaft 6 while the shaft 5 continues its rotary movement in the same direction, I may employ a gearing construction which will now be explained. A bevel gear 39 is applied to the housing 15. As shown in the drawing, this gear has a threaded shoulder 40 which is screwed into the interiorly threaded opening at the end of the housing where the driving shaft enters. This gear, as illustrated, carries bearing balls 41 which engage a conical journal 42 of the driving shaft. A second bevel gear 43 is mounted on a short shaft 44 whose axis is at right angles to the axis of the shaft 5. This shaft is journaled as shown at 45 in a stationary arm 46 mounted on a member 47 of the stationary framework. The gear 43 is constantly in mesh with the gear 39. Also mounted on the shaft 45 is a gear 48 which is normally out of mesh with a gear 49 splined on the shaft 5. When these gears are in the relation just explained, the movement of the shaft 5 in a given direction imparts a movement to the shaft 6 in a corresponding direction, assuming that the obliquity, inclination or non-coaxial relation of the members 8 and 9 with the shaft 5 is maintained. Now, if it is desired to reverse the direction of travel of the shaft 6 while the shaft 5 continues its rotation in the same direction, the gear 49 will be thrown into mesh with the gear 48, through the medium of a yoke 50 whose bifurcated extremity 51 engages a circumferential groove 52 formed in the hub of the gear 49.

As shown in the drawing, the driving shaft 5 is journaled in the relatively stationary support 47, and also in a support 53. The driven shaft 6, in addition to being journaled in the relatively stationary support 32, is also journaled in an additional support 54. It must be understood that the manner of supporting these shafts is purely conventional, and is simply a matter of convenience in illustrating a structure from which the operation of my improved transmission mechanism may be explained.

In the construction shown in Fig. 8, a single spring 33 only is employed for throwing the members 8 and 9 into non-coaxial relation with the driving shaft 5. Furthermore, the cam 21 as well as the coöperating anti-frictional roller 19 carried by the member 9, is omitted. This construction, namely, that shown in Fig. 8, is complete, in the sense that it will operate for the performance of the functions heretofore explained when speaking more particularly of the specific construction disclosed in Figs. 1 to 7 inclusive. In Fig. 8, instead of a relatively large disk 24, I have employed a disk 55 of less diameter, but I have mounted on this disk an arm 56, whereby the position of the single spring 33 is advantageous for the performance of its function in connection with the member 9.

In the construction shown in Fig. 9, the two members 8 and 9 are constructed somewhat differently from the corresponding parts in the views heretofore described. The member 8 in Fig. 9 is provided with a circumferential groove 57 which is exteriorly open to receive projections 58 which are diametrically located upon and project interiorly from the member 9, these projections carrying anti-frictional rollers 59. It is evident that this construction will give substantially the same results as the construction disclosed in the other views. In Fig. 9 the coaxial relation between the members 8 and 9 and the shaft 5 is established and will continue until the member 8 is turned to bring the pivot pin 60 which connects it with the flattened end of the shaft 5, into position at right angles to that shown in Fig. 9, or into such position that the stress of the spring 33 shall be applied or directed at right angles or crosswise to the axis of the pivot, or into such position that the member 8 may turn on the pivot 6 under the influence of the tension of the single spring 33 exerted in the direction shown in the drawing.

Again, in Fig. 11 another modification in the construction for connecting the two members 8 and 9 in coöperative relation is illustrated. In this case the member 9 is provided with a circumferential groove 65 which opens at its inner circumference to receive anti-frictional rollers 61 carried by exterior projections mounted on the member 8. It is evident that this connection between the two members 8 and 9 will produce the same results as the constructions disclosed in the other views.

While, as illustrated in the drawing, the cam 21 is mounted on a collar 22 loose on the shaft 6, the collar being held under tension against rotary movement on the shaft by a spring 23, it must be understood that this cam may be rigidly mounted on the shaft; or the collar 22 may be held against rotation by a spring 23 of sufficient strength to make the connection of the collar with the shaft substantially rigid. In the event that the connection of the cam with the shaft is rigid or substantially so, the face of the cam must be accurately cut to properly perform its function.

In further explanation of the function and operation of the cam 21 and the roller 19, I will state that the over-turning action to the left at the bottom of the driving unit, forces the cam roller 19 (see Fig. 2) outwardly and upwardly against the crank campath 21, thus communicating its stress to the shaft 6 in the same direction as does the spring 33 in Fig. 2. One or both of these constructions can be used, but the drawing does not show the cam as developed scientifically, it being understood that in practice this cam and the cam-path must be developed and formed to give the required rise for a given amount of travel in the peculiarly spiral path which it describes, thus the lever in the cam form is here introduced.

Having thus described my invention, what I claim is:—

1. Power transmission mechanism including in combination with a driving shaft and a driven shaft, two members one of which is connected to rotate with the driving shaft and the other with the driven shaft, means for connecting the two members to maintain them in coaxial relation with each other, and means for yieldingly holding the two members in non-coaxial relation with the driving shaft, the driving shaft member being pivotally connected with its shaft to permit oscillatory movement on the axis of its pivot.

2. Power transmission mechanism including in combination with a driving shaft and a driven shaft, two members one of which is connected to rotate with the driving shaft and also to oscillate thereon, the other member being connected to rotate with the driven shaft, means for connecting the two members to maintain them in coaxial relation with each other and to allow the driving shaft member to rotate freely within the driven shaft member, and means for yieldingly retaining the two members normally in non-coaxial relation with the driving shaft.

3. Power transmission mechanism including in combination with a driving shaft and a driven shaft, two members, one member being connected to rotate with the driving shaft and the other with the driven shaft, a connection between the two members to maintain them in constant coaxial relation with each other and to allow one member to rotate independently of the other member, a connection between the driving shaft and its member to permit the latter to oscillate thereon, and an operative connection between the driving shaft member and the driven shaft member to cause the driving shaft member when in motion rotatively to impart oscillatory movement under stress to the member connected with the driven shaft when the latter is stationary.

4. Power transmission mechanism including in combination with a driving shaft and a driven shaft, two members one of which is connected to rotate with the driving shaft and the other with the driven shaft, the driving shaft member being also pivotally connected with its shaft to permit oscillation on an axis extending at right angles to the longitudinal axis of the driving shaft, means for yieldingly maintaining the driven shaft member in non-coaxial relation with the driving shaft, and an operative connection between the said members to permit one to rotate independently of the other to which it imparts a stress of predetermined magnitude.

5. The combination with a driving shaft and a driven shaft, of two members connected to rotate with the respective shafts, the driven shaft member being mounted to oscillate on an axis intersecting the longitudinal axis of the driven shaft at right angles, and a connection between the two members to cause the rotary movement of one shaft member to impart oscillatory movement to the oscillating member while the other shaft is stationary, and means for normally yieldingly retaining the stationary shaft member in non-coaxial relation with the driving shaft.

6. The combination with driving and driven shafts, of two members connected to rotate with their respective shafts, means for maintaining the two members in coaxial relation with each other, means for yieldingly retaining the two members in non-coaxial relation with the driving shaft, one of the members being pivotally connected with the driving shaft to permit oscillatory movement on an axis extending at right angles to the longitudinal axis of said shaft.

7. The combination with driving and driven shafts, of two members connected to permit one to rotate within the other and to maintain the said members in coaxial relation with each other, one member being pivotally connected with the driving shaft to permit oscillatory movement on an axis at right angles to the longitudinal axis of its shaft, and a spring connection between the driven shaft and its member to normally maintain the two members in non-coaxial relation with the driving shaft.

8. The combination with driving and driven shafts, of two members, a connection between the two members to permit one to rotate within the other and to maintain the said members in coaxial relation with each other, one member being pivotally connected with the driving shaft to permit oscillatory movement on an axis at right angles to the longitudinal axis of its shaft, a spring connection between the driven shaft and its member to normally maintain the two members in non-coaxial relation with the driving shaft, and an abutment mounted on the driven shaft, the corresponding member of the driven shaft having a projection engaging said abutment to prevent independent rotary movement of the driven shaft and its member.

9. The combination with driving and driven shafts, of two members, a connection between the two members to permit one to rotate within the other and to maintain coaxial relation with each other, one member being pivotally connected with the driving shaft to permit oscillatory movement on an axis at right angles to the longitudinal axis of its shaft, a spring connection between the driven shaft and its member to normally maintain the two members in non-coaxial relation with the driving shaft, an abutment carried by the driven shaft, its corresponding member having a projection engaging said abutment to cause the said member and its shaft to rotate in unison in a given direction, a cam loose on the driven shaft, and means for yieldingly retaining the cam against rotary movement on the driven shaft, the driven shaft member having a projection in whose path said cam lies.

10. The combination with driving and driven shafts, of two members, a connection between the same to permit one to rotate within the other and to maintain the members in coaxial relation with each other, one member being pivotally connected with the driving shaft to permit oscillatory movement on an axis at right angles to the longitudinal axis of the shaft and to cause the last named shaft and its member to rotate in unison, a spring connection between the driven shaft and its member to normally maintain the two members in non-coaxial relation with the driving shaft, an abutment mounted on the driven shaft, the driven shaft member having a projection in whose path the abutment lies, to prevent independent rotary movement of the driven shaft and its abutment in a given direction, a cam loose on the driven shaft, means for yieldingly retaining the cam against independent rotary movement on the driven shaft, its corresponding member having a projection in whose path said cam lies, and means for regulating the tension of the said spring connection between the driven shaft and its said member.

11. The combination with driving and driven shafts, of two members, a connection between the two members to permit one to rotate within the other and to maintain coaxial relation with each other, one member being pivotally connected with the driving shaft to permit oscillatory movement on an axis at right angles to the longitudinal axis of its shaft, a spring connection between the driven shaft and its member to normally maintain the two members in non-coaxial relation with the driving shaft, an abutment carried by the driven shaft, its corresponding member having a projection engaging said abutment to cause the said member and its shaft to rotate in unison in a given direction, and a cam mounted on the driven shaft, the driven shaft member having a projection in whose path said cam lies.

In testimony whereof I affix my signature in presence of two witnesses.

HARRY A. RHODES.

Witnesses:
GRACE HUSTON,
A. J. O'BRIEN.